US008160902B2

(12) United States Patent
Spalding, Jr.

(10) Patent No.: US 8,160,902 B2
(45) Date of Patent: Apr. 17, 2012

(54) SYSTEM FOR FACILITATING LIFE SETTLEMENT TRANSACTIONS

(76) Inventor: Philip F. Spalding, Jr., Larkspur, CA (US)

( * ) Notice: Subject to any disclaimer, the term of this patent is extended or adjusted under 35 U.S.C. 154(b) by 1430 days.

(21) Appl. No.: 10/789,158

(22) Filed: Feb. 27, 2004

(65) Prior Publication Data

US 2005/0192849 A1   Sep. 1, 2005

(51) Int. Cl.
*G06Q 40/00* (2012.01)
(52) U.S. Cl. ............... 705/4; 705/35; 705/36 R; 705/37
(58) Field of Classification Search .............. 705/4, 35, 705/36 R, 37
See application file for complete search history.

(56) References Cited

U.S. PATENT DOCUMENTS

| | | | |
|---|---|---|---|
| 6,044,352 A * | 3/2000 | Deavers .......................... | 705/4 |
| 6,904,410 B1 * | 6/2005 | Weiss et al. ..................... | 705/27 |
| 7,143,051 B1 * | 11/2006 | Hanby et al. ..................... | 705/4 |
| 2001/0034619 A1 * | 10/2001 | Sherman ........................... | 705/4 |
| 2002/0091613 A1 * | 7/2002 | Kendall et al. .................. | 705/37 |
| 2002/0198743 A1 * | 12/2002 | Ariathurai et al. ............... | 705/4 |
| 2004/0064391 A1 * | 4/2004 | Lange ............................. | 705/36 |

* cited by examiner

*Primary Examiner* — Valerie Lubin
(74) *Attorney, Agent, or Firm* — Philip H. Albert; Kilpatrick Townsend & Stockton, LLP

(57) ABSTRACT

A system and method for buying and selling life insurance policies includes an online database for storing information concerning in-force policies as needed for evaluation by a potential buyer. Owners of policies, either directly or through agents, who might be willing to sell their policies, register with the online website with critical financial and medical underwriting information relating to their policies, as needed for evaluation by a potential buyer. In the online database such information is organized and categorized as to parameters of various medical and financial information, to be reviewed online in an orderly manner by investors and potential buyers of policies. A membership preferably is required for a potential buyer to have access to the online information. In a preferred implementation of the system, an auction is held online to obtain essentially the best price for each policy.

13 Claims, 9 Drawing Sheets

BUY A POLICY  ☐ BROWSE ALL

SEARCH CRITERIA (CHECK ANY OR ALL BOXES THAT APPLY)

☐ JOINT LIFE  ☐ SINGLE LIFE  ☐ TERM  ☐ UNIVERSAL LIFE  ☐ WHOLE LIFE

☐ ALL  ☐ MALE  ☐ FEMALE

AGE - ☐ ALL  30-40  40-50  OR  40-45 - ETC

FACE AMOUNT

☐ - 100K  ☐ - 200K ETC  ☐ +10 MILLION

POLICY DATE:  ☐ 0-2 YEARS  ☐ 2-5 YEARS  ☐ 5-10 YEARS

HEALTH STATUS:  ☐ VIATICAL OFFERS ONLY

1st INSURED  ☐ SUPER PREFERRED  ☐ PREFERRED  ☐ STANDARD

☐ T1-T3  ☐ T3-T6  ☐ DECLINE

2nd INSURED  ☐ SUPER PREFERRED  ☐ PREFERRED  ☐ STANDARD

☐ T1-T3  ☐ T3-T6  ☐ DECLINE

LIFE EXPECTANCY (FROM OUR APPRAISAL OFFICE)

-1 YR☐  2 YRS☐  3 YRS☐  4 YRS☐

CASH SURRENDER VALUE

☐ 0 TO 10% OF FACE AMOUNT  ☐ 10-20% OF FACE AMOUNT

PREMIUMS

☐ NO ONGOING  ☐ 0 TO 1% OF FACE  ☐ 1 TO 5% OF FACE ANNUALLY
☐ GO                           (ETC)

*FIG. 4*

| POLICIES | CURRENT BID | MAKE A BID | IN-FORCE ILLUSTRATION | INSURED MEDICAL RECORDS | APPRAISED VALUE | TOTAL FACE AMOUNT | LIFE EXPECTANCY | % OF CASH VALUE TO FACE AMOUNT | % OF PREMIUM TO FACE AMOUNT | DAYS LEFT |
|---|---|---|---|---|---|---|---|---|---|---|
| BAS. | 72 | 84 | 85 | 83 | 76 | 74 | 78 | 80 | 82 | 1 |
| | | | | | | | | | | 1 |
| | | | | | | | | | | 2 |
| | | | | | | | | | | 2 |
| | | | | | | | | | | 2 |
| | | | | | | | | | | 3 |
| | | | | | | | | | | 3 |

*FIG. 5*

☐ SUBMIT A NEW POLICY ☐ SELL A POLICY ☐ TRACK CURRENT AUCTIONS
↳ TO BROWES PAGE

↳ NEEDED FORMS TO SIGN (ON LINE IF APPROVED OR A FORM WILL BE MAILED)
  ☐ DISCLOSURE ☐ MEDICAL RELEASE ☐ CREDIT CHECK
  ☐ IN FORCE ILLUSTRATION AUTH. ☐ DISCLOSURES, ETC.

STATE → DROP DOWN MENU

INSURED INFORMATION
  ☐ DATE OF BIRTH
  ☐ NAME (ENCRYPTED)
  ☐ ADDRESS
  ☐ CONTACT INFO

* ONCE THE MEDICAL FORMS ARE SIGNED AND WE OBTAIN THE RECORDS AND THE IN FORCE ILLUSTRATION, WE WILL PUT ALL THE INFORMATION INTO OUR DATABASE.

☒ SHOW ME PROPRIETARY TECHNIQUES.

☐ I WANT TO SELL MY POLICY AND REPLACE IT WITH A NEW ONE.

☐ GIVE ME AN OFFER RIGHT NOW.

| ☐ TRACK MY POLICY AND NOTIFY ME WHEN TO SELL IT. | ☐ GIVE ME AN APPRAISAL |
| --- | --- |
| | PAY HERE |

*FIG. 6*

APPRAISE A POLICY

☐ VIEW MY POLICIES THAT HAVE BEEN APPRAISED

☐ GIVE ME A FORMAL APPRAISAL

⟶ SEND THEM TO THE SELL A POLICY PAGE TO GET THEIR INFORMATION AND SEND THEM THE NECESSARY FORMS.

☐ GIVE ME AN INFORMAL APPRAISAL

<u>INPUT SCREEN</u>

☐ AGE

☐ HEALTH ↓ DROP DOWN SCREEN

☐ PREMIUMS DUE % OF FACE

☐ CASH VALUE

*FIG. 7*

TRACK YOUR POLICY

MENU

- ☐ DON'T LET IT LAPSE
- ☐ REMIND ME TO PAY PREMIUM
- ☐ NOTIFY ME WHEN IT'S TIME TO SELL
- ☐ PURCHASE MY POLICY NOW
- ☐ APPRAISE MY POLICY
- ☐ CALCULATE A SWAP

AGENTS

- ☐ SEND ME SOFTWARE THAT TRACKS MY POLICIES AND COMMUNICATES WITH THE SITE.
- ☐ LET ME UPLOAD MY POLICY INFORMATION TO YOUR SITE WITH SOFTWARE THAT IS COMPATIBLE WITH
  - ☐ GOLDMINE   ☐ POLICY DATABASE

*FIG. 8*

SWAP MY POLICY

INPUT SCREEN
- ☐ AGE  ☐ SEX  ☐ HEALTH STATUS  ☐ HEIGHT  ☐ WEIGHT
- ☐ SHOW CURRENT APPRAISED VALUE
    OR
- ☐ CALCULATE APPRAISED VALUE

[_____] ENTER CURRENT ANNUAL PREMIUMS

[_____] ENTER NUMBER OF YEARS PREMIUMS ARE DUE

[_____] ENTER FACE AMOUNT

[ RUN ]

OUTPUT SCREEN

EITHER
1.) ANNUAL SAVINGS  "SELL YOUR POLICY NOW"  [__]
2.) WAIT TO SELL YOUR POLICY

*FIG. 9*

SYSTEM FOR FACILITATING LIFE SETTLEMENT TRANSACTIONS

BACKGROUND OF THE INVENTION

This invention concerns financial transactions, and specifically the invention is directed at life settlements (or senior settlements) and viatical settlements (sometimes collectively referred to herein as life settlement transactions), and the creation of an efficient market in such transactions.

With the AIDS epidemic that began in the 1980s, life settlement transactions began to be seen as a useful tool for realizing liquidity from an existing, in-force life insurance policy during the insured's lifetime. AIDS victims facing inevitable and proximate death were offered cash for the transfer of their life insurance policies with beneficiary and ownership rights transferring to the buyer. The buyer would then make remaining premiums (if necessary) until the death of the insured. This provided cash where none would otherwise be available during the lifetime of the insured, but only to a survivor. Viatical settlements refer to insureds with actuarial life expectancy of less than two years. Since the inception of viatical settlements, a new market in the form of senior settlements (or life settlements) has developed for the sale of policies with life expectancies of more than two years. Typically these policies insure seniors over the age of 65 or perhaps younger if the insured has health issues. Generally speaking, investors are looking for policies where the insured's life expectancy is less than 15 years. A growing market has arisen for the purchase and sale of life insurance policies in such life settlement transactions.

However, both viatical and life settlement markets have been essentially unregulated, and unconscionable commissions and profits have been gleaned from many life settlement and viatical settlement transactions. Many feel this to be the case in the majority of such transactions. In nearly all cases the policy owner selling a policy is not made aware of the actual price for which the policy is purchased, but only knows the amount he is paid. Brokers specializing in the purchase of life policies, usually on behalf of investors such as large insurance companies, pension funds, etc., take a very large percentage of the purchase price, often over 30%. In almost all cases there are other levels involved, such as agents who themselves take hefty commissions. The result is that the owner of the policy, usually the insured, receives a greatly reduced portion of the true value of the policy, perhaps only 50% to 60% of the true value. Normally the owner/insured has no idea of the true value of the policy. Because of the inconsistency in life insurance medical underwriting, the owner (insured) is often only given enough of the proceeds to pacify him. Often the agent will then show the client how to take the proceeds and purchase either more insurance or the same amount of the coverage at a lower annual premium.

Changes have been occurring in the insurance industry, particularly in the United States. Life expectancy has increased considerably in recently decades, and rates for life insurance, particularly term insurance, have dropped a great deal. Additionally, insurance companies price their policies with the idea that 5 out of 6 of them will lapse and never pay a death benefit. This has the effect of driving down the cost of policies due to the retained earnings of paying less in claims. As a result, an insured holding an older policy (usually permanent insurance, i.e. a "whole life", or "universal life" policy) often finds that he can obtain life insurance with a far higher death benefit than under his current insurance, by purchasing a new policy, without any increase in the premium being paid, or potentially a substantial decrease. This situation presents a strong incentive for an insured to enter into a life settlement transaction, selling the existing policy and realizing a fairly large sum of money, which can then be used to buy a permanent insurance policy with a far higher death benefit. The insured can also use the proceeds for other purposes.

This situation has caused a continually growing market in life settlement transactions. However, and unfortunately, the very large profits taken by brokers in these transactions has deprived policy owners of a fair value for the sale of their policies, and has actually had a negative effect on the organized entry into this market by large and reputable insurance companies. Being unregulated and having a reputation as being run by profiteers, the market has caused many influential and potentially beneficial buyers to shy away because of potential trouble and damage to reputation.

Accordingly, there has been a need for an efficient market for life settlement and viatical settlement transactions, a market which policy owners can enter with a fair degree of confidence that they will be obtaining a good and competitive value for their policies, and consequently, a market where buyers of policies can avoid over-paying for policies only to benefit the layers of profiteers that stand between them and the seller.

SUMMARY OF THE INVENTION

The invention addresses this need by providing an efficient marketplace, in the form of an online auction, for life settlement and viatical transactions. Instead of relying on specializing brokers who obtain the best price from a buyer and the lowest payoff to the insured/seller, without disclosing the actual value of the policy to the seller, the market established by the invention places all critical information, including personal, financial and medical underwriting information relating to the policy of each owner, in an online database for review by potential buyers. A pre-arranged membership preferably is required for a potential buyer to have access to this online information, and memberships may also be required of potential sellers of policies, or agents for those sellers. Steps may be taken to assure the confidentiality of the personal, financial and medical information relating to an insured; for example, the insured's name, address and social security number may be omitted from the information contained in the online database. Agents may be used to find life insurance policies and to obtain the needed information regarding each policy, but these agents are paid on a consistent commission basis, rather than paying the agent and a life settlement broker in the manner in which many have profiteered in the previous unregulated and disorganized market. Advertising directly to policy holders may also be used to obtain policies for potential sale.

As a corollary function of the internet website containing the database, a service may be provided for appraising in-force life insurance policies, once potential sellers have given the website access to critical personal, financial and medical information regarding a policy. With the availability of such straightforward and realistic appraisals, the interest in placing policies on the auction database will increase. Additionally the site will track certain policies for insureds and/or agents in order to make sure they do not lapse prior to a time when they might be sold.

The online auction itself is conducted in the following way:

The auction is held on a website, where policy owners, either directly or through agents or other authorized parties, give the website access to data relating to an in-force policy to be sold and an auction is held online for each policy that is put up for sale. The seller or agent specifies the conditions, such as with or without reserve, reserve meaning that the policy is withheld from sale if a certain minimum bid is not obtained. The duration of the auction may be set by the website or, if permitted by the website, by the seller or agent (several days or two weeks mignt be typical). Normally the highest bid thus far will always be displayed ("current bid") so that potential buyers will submit only bids that are higher than the previous high bid. However, an auction could be made via "blind bidding", since there is sometimes a psychology in blind bidding that will produce a higher bid than otherwise. The auction on a particular policy, normally at the decision of the seller or agent, can specify a "buy it now" feature, whereby a prospective purchaser can avoid bidding against others by paying a "buy it now" price that is posted. A "sell it now" feature can also be offered to the seller. The benefit would be to avoid paying any commissions on the transaction. The sell it now feature is a fund set up by the site to purchase policies from its policy owners.

All data posted online can be anonymous if requested by the seller and searchable by category, such as by death benefit, by age or range of age of insured, by actuarial life expectancy of the insured, by percentage of cash valve as it relates to death benefits, by premiums as a percentage of death benefits, by health conditions, etc. All data relating to an insured in a policy are entered into the database as the policy is posted, so that each policy can be found by a potential buyer's searching any of a number of different fields.

It is therefore among the objects of the invention to create an online central clearing system for life settlement and viatical settlement transactions ("life settlement transactions"), to produce an efficient and central market that brings buyers and sellers directly together, eliminating high profits of middlemen and establishing a market where policy holders can realize the highest price for their policies in competitive and open bidding. These and other objects, advantages and features of the invention will be apparent from the following description of a preferred embodiment, considered along with the accompanying drawings.

DESCRIPTION OF THE DRAWINGS

FIG. 4 is a "buy a policy" page, which can be selected from the screen of FIG. 3 and which allows a prospective buyer to search for policies according to selected criteria.

FIG. 5 is a schematic representation of a screen or page which will come up after the user has entered appropriate search information.

FIG. 6 represents a sell policy screen which can be selected from the screen of FIG. 3, and with provision for the user to make selections and enter information.

FIG. 7 is a representation of an appraise a policy screen that can also be selective from the screen of FIG. 3.

FIG. 8 is a representation of a track a policy screen, another screen that can be selected by the user from the screen of FIG. 3. This provides screen a number of choices.

FIG. 9 represents a screen which will arise from a certain selection is made from the screen in FIG. 8.

DESCRIPTION OF PREFERRED EMBODIMENTS

Figure 1:
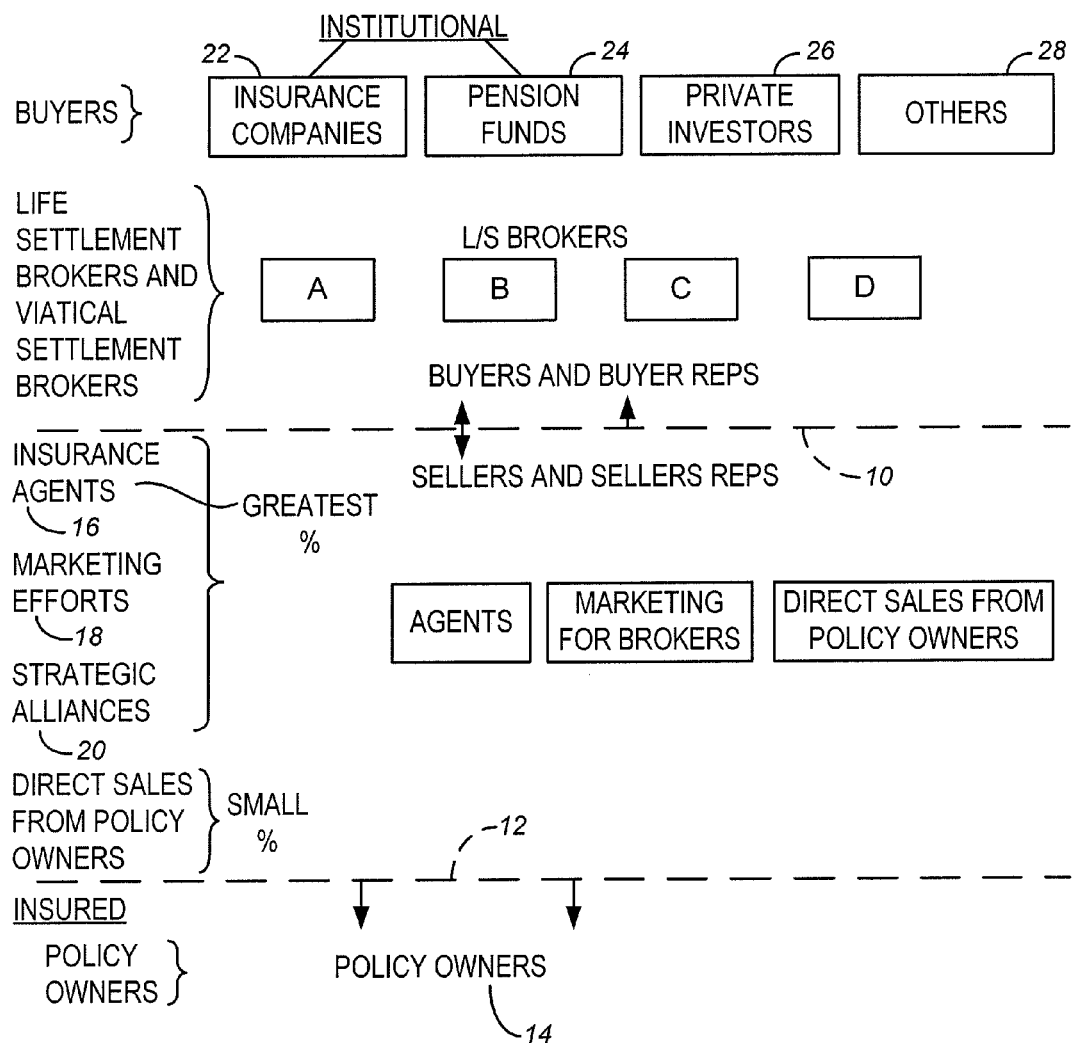
FIG. 1 is a block diagram showing schematically the system in place prior to this invention, for buying and selling insurance policies in life settlement transactions and viatical transactions.

FIG. 1 shows the system of the prior art, i.e., the typical transactions and layers of parties involved in a life settlement or viatical transaction. In the drawing, sellers and representatives of sellers are shown below the dashed line 10. This includes, below the dashed line 12, policy owners or insureds themselves, indicated at 14. The policy owners in the typical system prior to the invention would usually contact or be contacted by insurance agents indicated at 16, regarding the possibility of sale of their in-force policies. The drawing indicates that insurance agents engage in marketing efforts 18, and may have formed strategic alliances 20 with other companies that service seniors (such as other insurance products, annuities or prescriptions drugs) to enlist policy owners to sell their policies.

As indicated in the block diagram of FIG. 1, the other avenue for an insured or policy holder to sell a policy is by a direct sale to a buyer, but this is virtually always through a life settlement broker. These direct sales constitute a small percentage of these transactions.

Under the currently existing (prior art) system, each insurance policy travels through life settlement and viatical brokers shown at A, B, C and D above the dashed line 10 in the drawing. These life settlement brokers, as discussed above, usually reap a very large piece of the purchase price for the policy, approximately 20% to 30% of the face amount. The brokers (A, B, C, D) have contacts with buyers, examples being indicated in the drawing at 22, 24, 26 and 28. The brokers offer insurance policies to one or several of these buyers/contacts. In some cases, a certain broker may deal exclusively with a certain institutional organization, such as an insurance company 22 or a pension fund 24. The broker secures the best price he can for a given insurance policy. It should be noted that different buyers, particularly institutions such as insurance companies, will view the financial, medical and personal history of an insured differently, just as some insurance companies may find a particular person insurable, or insurable at a reasonable rate, while others will not, based on personal and medical history. Potential buyers in life settlement transactions and viatical settlement transaction will also interpret the medical and personal histories differently. Some may find a much greater likelihood of longer term survival of a certain insured than will others. Clearly the others will pay more in a viatical or life settlement transaction. This is why a broker wants to offer a policy to a number of different buyer parties in seeking the best purchase price.

However, as explained above, the policy owners or insureds 14 do not see this purchase price. They are simply told by an agent 16, or by a broker (A, B, C, D) in the case of dealing directly with such brokers, what the insured will be paid for the policy. The agent or broker may initially indicate to the insured/policy owner a minimum he can obtain, or a probable range, and the settlement transaction may not be completed until the insured or policy owner has a chance to see the price being offered, after the broker has dealt with the buyers to obtain the best offer at that end. As noted above, the policy owner may know the "cash surrender value" of the policy, which is often referred to as a measurement of the fair market value of the policy because it is a available to the policy owner if needed. The life settlement or viatical offer is, of course, often considerably more than this "cash value" amount. Thus, the policy owner is likely to accept a life settlement/viatical transaction purchase which only pays the buyer 40% to 80% of what the policy is actually worth to the highest bidder. Note that the agent 16, if involved, takes a commission as well, but this is usually a percentage pre-agreed with the broker, such as 4% to 6% of the face amount of the policy and not an unconscionable portion of the total purchase price as in the case of the broker.

Figure 2:
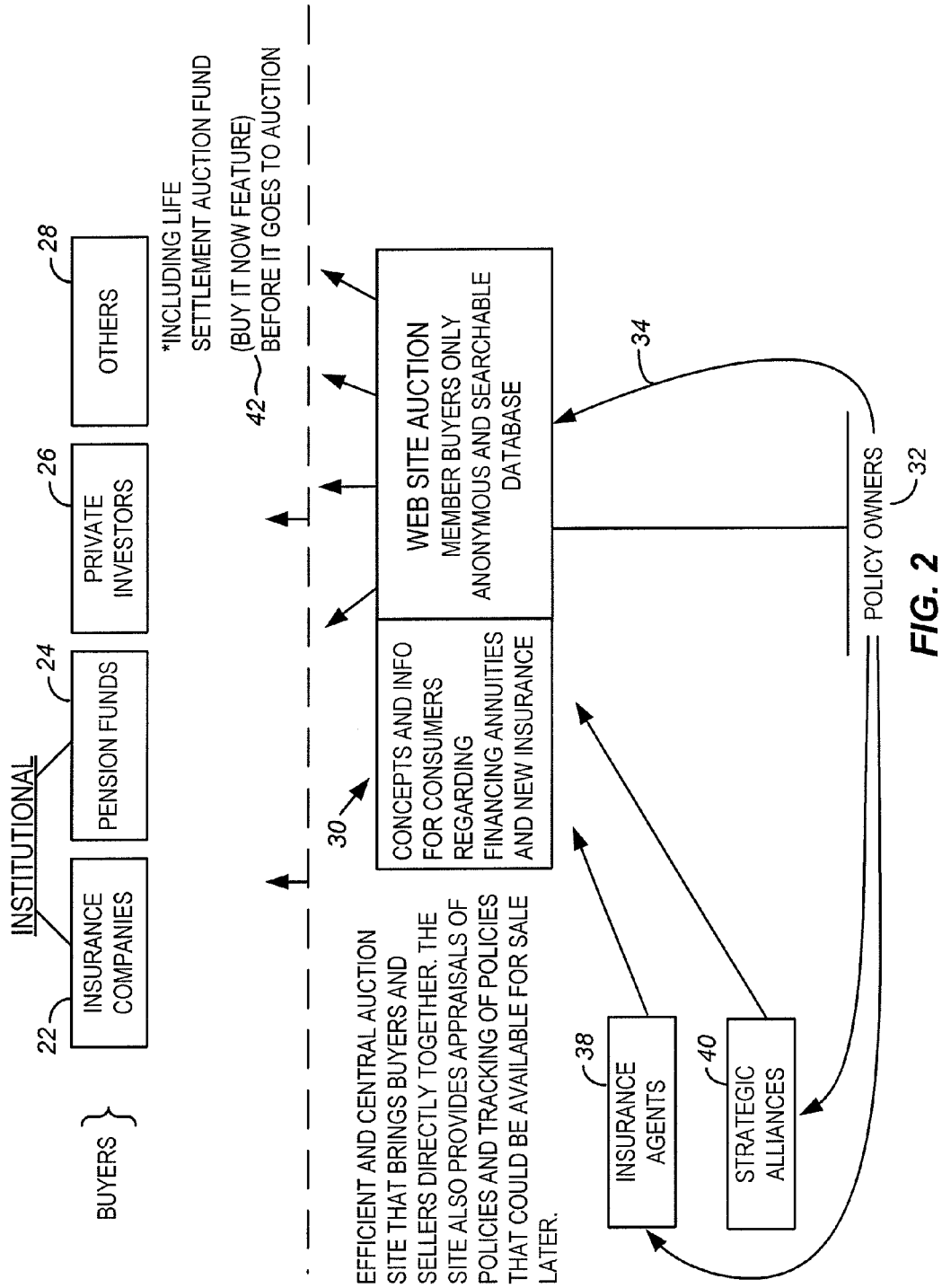
FIG. 2 is a block diagram outlining the system of the invention, with a central auction site for bringing sellers and buyers together in life settlement and viatical transactions.

FIG. 2 shows the system of the invention. Here, an Internet website 30 acts as a central clearing house for purchase and sale of in-force life insurance policies, in viatical settlements and life settlement transactions; the website 30 receives information about policies that might be sold by the policy owners 32, provided an adequate return is realized by the policy owner. This information includes anonymous and searchable data, particularly financial, medical and personal data concerning the policy and the insured. Buyers will also have access to a PDF file of the medical records as well as an in-force illustration. Information from the medical records and in force policy is extracted and can be searched by category (as explained above) by authorized buyers who are members. These buyers, again, may include insurance companies 22, pension funds 24, private investors 26 and others 28, including foreign investors. These parties have pre-arranged memberships with the website 30, and access to the policies in the website's database, using a password. This provides an efficient and central auction site that brings buyers and sellers directly together. There will also be the capability to change the language of the text to assist foreign investors.

As indicated in the drawing, policy owners 32 may directly access the website 30 (indicated at arrow 34), and a member may be required on the policy owner's side as well. In either event, the information on the website fully discloses to the policy owner the nature of the life settlement transaction, and the nature of the auction which is proposed for the owner's policy, with instructions as to how to give the company access to the policy owner information in order to post the policy on the website and in the database. The owner will be required to enter a name and contact information, but this will be kept confidential and not posted as part of the critical information that will be available to potential buyers.

As indicated in FIG. 2 and as noted above, the website 30, although accessed in many cases directly by policy owners 32, may also be accessed by insurance agents 38, acting on behalf of policy owners. These agents can directly provide policy owners information as just discussed, regarding the possibility of buying larger face value insurance policies using a lump sum received from a life settlement or viatical transaction, or paying for such insurance through other creative planning options. Such information is important in giving the policy owner an understanding of the advantages that can be realized in making such a transaction and purchasing a greater amount of insurance without actual cost. The proceeds of the life settlement are taxable above the basis (premiums paid). The amount above the basis can also be structured to be tax-free under certain scenarios.

Strategic alliances 40 are shown in FIG. 2 as a way to drive more policies for potential sale to the site. These alliances would focus on companies that have products and services for seniors such as annuities and prescription drugs.

As explained above, the website 30 conducts auctions for each policy, although a group of policies could be auctioned together if such is seen to provide an advantage. Steps in conducting the auction are discussed above.

As also reviewed earlier, the website may include a "buy it now" feature, indicated at 42, similar to the auction offerings currently made on the eBay™ internet website.

Figure 3:
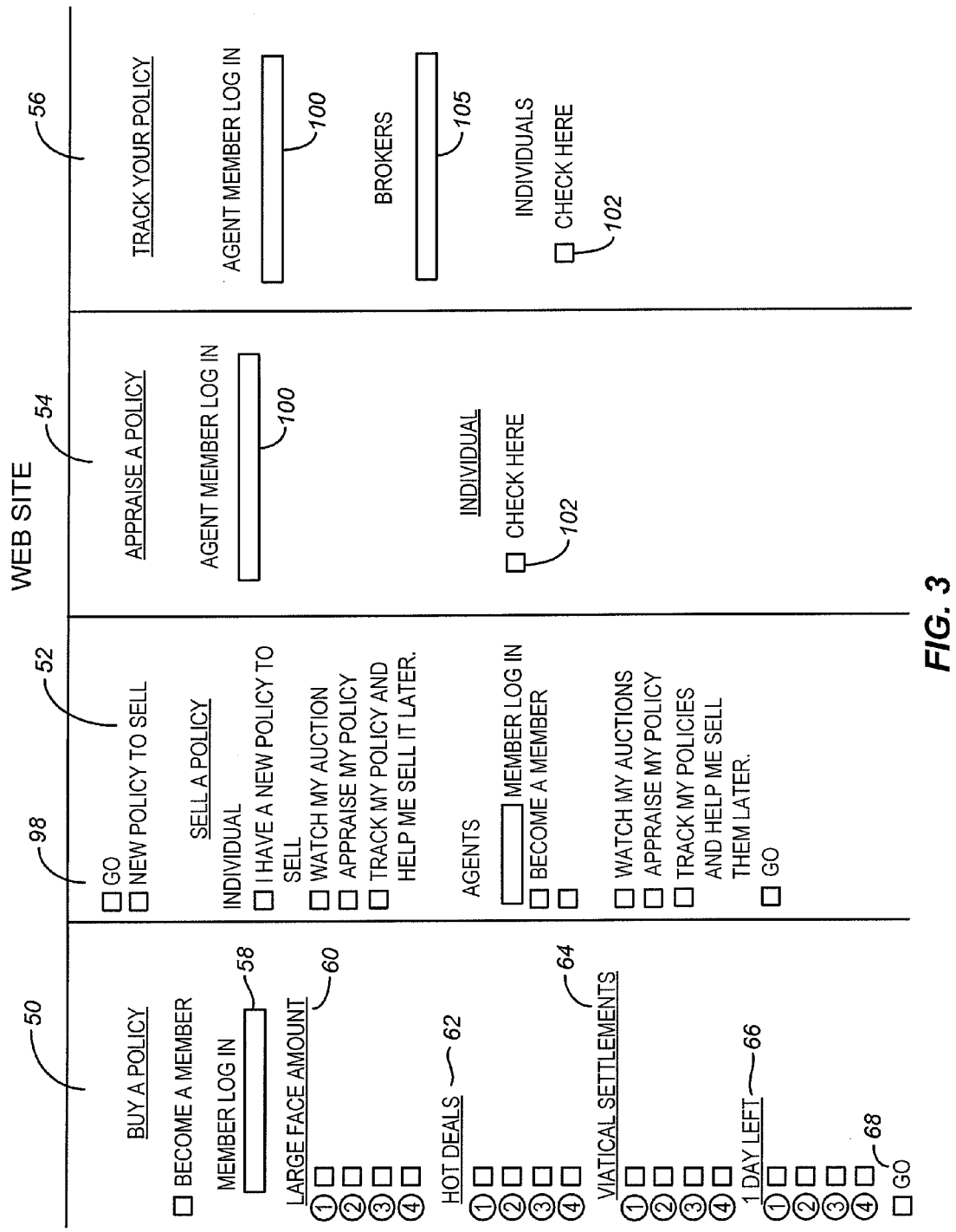
FIG. 3 is a diagram illustrating a home page or first operative page of a website which forms a principal part of the invention.

FIG. 3 shows an example of a home page or the first operative page of a website, in one manner of implementing the invention. In this example, the web page has four columns, buy a policy 50, sell a policy 52, appraise a policy 54, and track your policy 56. In the buy a policy selection, provision for member login is at 58. This is optional. Member login, based on pre-arranged membership in the website clearing vehicle, is preferred but may not be mandatory in all implementations of the invention. As shown in FIG. 3, the buy a policy selection column or page may have selected links 60, 62, 64 for either advertisement or for immediate review, such as large face amount policies that are for sale, "hot deals", or viatical settlements shown at 64 (these policies have life expectancy of two years or less). In addition, a link 66 may be included for ongoing policy auctions where only one day (or two days, etc.) is left until the auction ends. All policies listed in this column 50 may in effect be paid-for advertising, with a charge to the policy owner or agent for the policy being entered into any of the links 60, 62, 64, 66.

FIG. 4 shows an example of a "buy a policy" page which will be linked to the home page. To arrive at this page, the user preferably clicks on a "go" button 68 shown in FIG. 3.

The "buy a policy" page provides search criteria for the potential buyer. As shown in the drawing, the user can check any or all of the boxes indicating joint life policies, single life policies, term insurance, universal life, or whole life, and the user may specify male or female, age criteria and face amount, health status, life expectancy, cash value as a percentage of face amount, and premiums due as a percentage of face amount. Life expectancy as a search criterion will be available to search and find those policies where a life expectancy appraisal has been made by the system. The user will be advised that making a selection on this criterion may exclude a number of policies from review.

FIG. 4 also indicates a "browse all" box 70 that can be selected. This will bring up a plurality of policies, based on a system-set criteria as to the order such policies will appear on the page. The system can use as a preference the amount of time left in the auction for the policies, so that the shortest-time policies will appear at the top of the screen.

FIG. 5 shows an example of a screen that might appear after entry of all the criteria discussed relative to FIG. 4, or simply with the "browse all" choice 70 selected. In the latter event, the system will bring up a number of successive pages of policies that are up for sale, without regard to such criterion as the type of insurance, face amount, cash value, health status, etc. This will enable the user to browse through a large number of policies offered for sale, and to quickly compare current bid 72 to total face amount 74, appraised value 76 (if the system has appraised the policy), life expectancy 78, percent of cash value to face amount 80, percent of premium to face amount 82, or other values or data relating to the policy. At any time in the browsing of these pages the user can click on any of the criteria 72-82 and the system will then reorganize all of the listed policies on the basis of the criterion selected. The site can be operative to reverse the order (e.g., highest numbers down to smallest numbers, rather than smallest numbers down to highest numbers) if the same criterion is clicked twice.

If, rather than using the "browse all" link 70 in FIG. 4, the user has first entered some or all of the search criteria from the list in FIG. 4, then only those policies that fit the criteria selected will be displayed. Again, the system can have a default setting so as to display the list of policies based on the nearest in time for auction expiration down to the longest time, as discussed earlier. Then, the user can use the criteria 72-82 in the manner described above, to re-sort the listed policies in any manner desired. If the potential buyer selects a policy for purchase, the buyer can make a bid as indicated at 84. Because of the large amount of money involved in these auctions (sometimes millions of dollars), the website and the system of the invention will notify buyers and sellers that all sales are subject to verification by the buyer with regard to the information provided on the website. However, if a member/buyer creates a history of failing to go through with agreed purchases, that member can be subject to loss of membership, and denial of further access to the system.

The second column 52 in FIG. 3 is "sell a policy". An example of a web page for this purpose is shown in FIG. 6. As shown in FIG. 3 the user, who typically is an agent, preferably is required to log in as indicated at 86. The "sell a policy" column 52 also has provision for individuals, who are not agents, by clicking at a link 88. The individual user will then be presented with membership information if the user is not a member, or, in another implementation of the system, individuals are not required to be members, in the interest of obtaining more policies for sale on the site.

The link 90 shown in the "sell a policy" column goes to another page to sign a user up for membership, which is preferably required at least for agents.

The "sell a policy" column 52 may also include a link which can be characterized as "show me how viatical/life settlements work" 92. This will bring up a page or pages (not shown) that demonstrate for a potential policy seller the positive economics of selling a policy, obtaining a relatively large lump sum payment, and the uses to which that payment can be made to obtain a greater amount of coverage. Several examples, for different situations, can be presented.

The column 52 also has links for agents, at 92 and 94. These links enable agent/users to review all policies represented by the agent in the system, including those policies now in an active auction, those which are being appraised or have been appraised, and those which are being tracked, not currently for sale but which may reach a point of optimum timing for a sale. The link 94 enables the agent to enter a new policy, either for tracking, or for appraisal or auction.

The "sell a policy" column 52 can also include a link 96 that lets the agent or individual review any auctions of the policies represented by the agent or individual. This will bring up FIG. 5, with only those policy auctions of the agent or individual being shown.

FIG. 6, the "sell a policy" page, comes up when the user has entered the desired information in the column 52 and clicks on a "continue" button such as "go" 98 as indicated. The "sell a policy" page has a link 100 to submit a new policy, and 102 to enable tracking of current auctions where the user represents the policies or owns the policy. Again, that will bring up the screen of FIG. 5.

First, the agent or individual indicates the state in which the insured is located. This prompts the system to provide the regulatory information and forms needed to sell a policy, based on thee residence of the insured. These user can choose to call in or to receive these by mail, by e-mail or fax, or they may be provided online, on the website (if allowed by the state) for the user to enter information while on the site.

FIG. 6 also shows that the individual or agent will be prompted to enter personal information such as date of birth, name and address and contact information. The forms mentioned above are primarily consent forms that enable personnel in the system to obtain critical medical and policy information concerning the policy that is to be sold. This information, in detail, will be entered into the database of the system and retrievable by authorized potential buyers as noted in FIG. 5, at 83 (medical records) and 85 (in-force illustration). FIG. 5 shows that the potential buyer can review the insured's medical records, in a format such as PDF, and can review a current in-force illustration for the policy. Preferably the potential buyer can request to see a modified in-force illustration based on a change in one or more of the parameters, such as the duration or amount of premium that the buyer would want to commit after he purchases the policy. This information may be delayed, as it may involve required authorization to obtain the modified in-force illustration.

The bottom of FIG. 6 shows options for the potential seller to see proprietary techniques, i.e. examples of how a viatical or life settlement can be advantageous to the seller; or to see a demonstration of how the policy might be sold and replaced with a new, higher face value policy. This can be achieved by incorporating a computer program that first appraises a current value for life settlement and then has an input screen for the current premiums being paid. A new quote for a policy of the same death benefit is run and if the proceeds from the sale of the policy combined with an ongoing premium are more advantageous than the current policy, a "swap" is recommended as in FIG. 9 There may be a link for a "sell it now" offer, such as indicated ("give me an offer right now"). This gives the policy owner the option to obtain a payment for a policy without being subject to the risk of the auction, and without all commissions that are payable if the auction is completed. In this case the buyer will be the online database system, which can have a fund set up for purchases of policies without auction.

The bottom of FIG. 6 also shows links which preferably are included, to initiate tracking of an owner or agent's policy, with notification by the site (e.g., e-mail) when an optimal time arises to sell the policy, or to obtain an appraisal of a policy. These links will connect the user to the columns 56 and 54 in FIG. 3, the home page or first operational page of the site.

In FIG. 3 the "appraise a policy" column 54 preferably includes an agent member log on 100 and an individual indicator 102. Once one of these is selected and the information entered, a screen such as shown in FIG. 7 appears, "appraise a policy". This page enables a user to view one or more policies that have already been appraised, or to order a formal appraisal of a policy. This formal appraisal may be provided without charge, provided the client signs the required forms and meets certain criteria as to being a probable candidate for a life settlement or viatical transaction. FIG. 7 also shows a preferred feature whereby a user may obtain an informal appraisal, by entering basic information as indicated directly on the screen. These can include drop-down screens, with health standards that are well known and used in the insurance industry in the event an agent is entering information. These health standards range from a preferred status for a potential insured down through typically nine different tables, to a "decline" status. If an individual, such as a policy owner, is using the site, a different drop-down screen can be used for general information. This is only to provide an informal appraisal. The individual will be prompted to enter premiums, face value, etc., and cash value if known. The system will then automatically calculate, based on history and a database of transactions that have been completed, a rough estimate or approximate range of prices that might be obtained for the individual for the particular policy.

Returning to FIG. 3, the column 56 shows the option "track your policy". Here again, the agent normally is required to log in. Insurance brokers can also log in, at 105, and individuals can indicate status at 102. An example of a "track your policy" page is shown in FIG. 8. The drawing shows a list of services that can be provided to agents or individual owners. The purpose of the services is to keep a policy in good standing and to obtain a good price for the policy when an optimum time occurs to sell the policy. Thus, the list includes "don't let it lapse", which may be a service to make required premium payments in the event the policy owner forgets or is unable to make the premium payments. The premium payments might be made from funds deposited by the insured, such a fund bearing interest, or from another account of the insured, from which the system is authorized to withdraw needed funds for premiums. This provides added protection against losing a policy, for a person who has gone on the website and knows that a viatical or life settlement transaction may be a good option in the future. Other features are "remind me to pay premium", which can be via e-mail or regular mail, or other means, and "notify me when it is time to sell" which is based on the site's continual evaluation of the policy such as occurs when one chooses the "swap my policy" option shown in FIG. 8 and also FIG. 9. The "swap my policy" button is a link to an agent or broker who might be able to offer the user a better insurance policy, regardless of whether a life settlement transaction is involved. Other choices are "purchase my policy now" (or "sell now"), discussed above, "appraise my policy", also discussed above and "order in-force illustrations". This latter choice will bring up a screen with a consent form in the case of an individual, consenting to allow an agent or broker to obtain the in-force illustrations, or, if the user is an agent for the policy involved, the consent form is not needed.

The bottom of the screen of FIG. 8 is for agents only. This can enable the agents to order software via the site, to track policies handled by the agent, the software being capable of communication with the site. This can be a tool of efficiency for agents to deal with the site, with a large number of policies. The other choice for agents is to enable the agent to upload policy information, using software such as has been ordered via the choice above. Preferably the site includes software designed to communicate with existing programs used by agents for tracking their policies, such as Goldmine, for example.

FIG. 9 shows the "swap my policy" feature. Here, a potential seller can enter minimal information, on a policy which is not already in the system. As noted, these include age, sex, height, weight, health status. They can be entered with a pull-down screen or window that enables the user to select from a number of different choices. This can be the manner in which the other choices function, as well. The user of the system can then either select "show current appraised value" or "calculate the appraised value". The former is only for the case where the user's policy data is already in the system, and is part of the tracking described in FIG. 8. The option to calculate appraised value will give an approximate range of values for the policy based on the information entered by the user, for policies that are not already in the system. As seen in FIG. 9, the user is also prompted to enter his current annual premiums, the number of years premiums are due, and the face amount of the policy. The calculation of the approximate value is then done automatically, and in an output screen, as indicated in the drawing, the system algorithms will indicate the annual savings that could be realized by selling the policy for the approximate value and purchasing a new policy. This output is based on algorithms which have currently been used by life settlement brokers A, B, C and D in FIG. 1, for calculating an approximate current value of an in force policy. It is based on not only information such as shown in the upper part of FIG. 9, but also more detailed medical information, input after review of critical medical and personal information of the insured, including a review of actual medical records. The calculation is also based on typical algorithms used by insurance underwriters to determine the premiums for a new insurance policy based on personal and medical history, etc. With the use of these two types of algorithms, the software of the system can automatically make a comparison of current premiums with a new policy, with the same face amount or a higher face amount for the policy, etc, and display this to a user who wants to explore selling his policy. Note that in FIG. 8, the option "notify me when it's time to sell", can be an automatic calculation based on the above description, with the two types of algorithms in the system. The conclusion that the time is right to sell a policy being tracked is based on economic advantage of the policy holder in the event of such sale and "swapping" of a policy for a new policy.

The online website auction of the invention provides a far more efficient system for buyers and sellers in viatical and life settlement transactions. This will promote a higher price to the seller, approaching the fair market value for the transaction, and it will also aid the buyer to avoid paying too much for a particular policy.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A computer-implemented method for buying and selling in-force life insurance policies including a computer that supports operations of a website comprising at least a web-based interface, wherein access to at least one portion of the web-based interface is limited to administrators and authorized buyers or buyer representatives, and a database, the method comprising:

providing the database with information concerning a plurality of in-force life insurance policies;

locating, using the web-based interface, from among the plurality of in-force policies stored in the database, those in-force policies whose original policy owners are willing to entertain offers from potential buyers to buy the policy on the insured from that original policy owner;

obtaining, via the web-based interface, financial and medical underwriting information about the in-force policies from their original policy owners, as needed, and storing it in the database for evaluation by the potential buyers;

categorizing, the financial and medical underwriting information electronically so as to allow queries on the database, based on one or more category, to create a listing of in-force policies being tracked that are available for sale, by some query criteria, for review by the potential buyers, wherein the query criteria includes at least results of a life expectancy report and medical underwriting data stored in the database, the medical underwriting data relating to the original policy owner who is the seller of a policy in the database, in response to user interaction with the web-based interface, filtering offered policies at least based on life expectancy report data and medical underwriting data for those offered policies;

tracking membership records so that access to at least a buyer portion of the database is limited to potential buyers who are represented in those membership records; and coordinating auctions between potential buyers of policies and the original policy owners of those policies or their representatives.

2. The method of claim 1, further comprising granting access, via the web-based interface, to the database to a potential seller or an agent of the potential seller based on verification of a current membership record.

3. The method of claim 1, further comprising:
identifying, from the database via the server computer, potential sellers of their in-force life insurance policies; and
generating electronic messages that would be sent to these sellers or trigger a message to these sellers, advising them of an opportunity to sell.

4. The method of claim 1, wherein information concerning the in-force life insurance policy includes personal information of the in-force policy owner.

5. The method of claim 1, wherein the database is implemented in an on-line environment including a website.

6. The method of claim 5, further comprising holding an auction, using the web-based interface, for at least some of the in-force polices.

7. The method of claim 5, further comprising appraising, via the web-based interface, the in-force policies using an automated appraisal service.

8. The method of claim 5, further comprising providing the potential buyers access, via the web-based interface, to the financial and medical underwriting information of the owner and the owner's in-force policy stored in the database based on authorization by the owner or an agent of the owner.

9. The method of claim 5, further comprising sending an email, by the computer, to the potential buyers when one or more of the in-force policies meets one or more criteria, wherein an email address and the criteria are inputted into the database by the potential buyers.

10. The method of claim 5, further comprising tracking, by the web-base interface, a particular in-force policy at the request of the owner or owner's agent.

11. The method of claim 10, wherein tracking the in-force policy includes issuing reminders to the in-force policy owner or the owner's agent to pay premiums for the in-force policy.

12. The method of claim 10, wherein tracking the in force policy includes notifying the in-force policy owner or the owner's agent about a point in time when it would be advantageous to sell the in-force policy in a life settlement transaction.

13. The method of claim 10, wherein tracking the in-force policy comprises:
allowing the in-force policy owner or the owner's agent to enter information into the web-based interface about the owner's in-force policy;
calculating, by the computer, an approximate face value of the in-force policy; and
displaying, on the web-based interface, potential savings in premiums realized by selling the in-force policy for the calculated face value and buying a new policy with a lower premium.

* * * * *